(12) United States Patent
Helland

(10) Patent No.: US 11,232,083 B2
(45) Date of Patent: Jan. 25, 2022

(54) FACILITATING DYNAMICALLY UNIFIED SYSTEM OF RECORD IN AN ON-DEMAND SERVICES ENVIRONMENT

(71) Applicant: salesforce.com, inc., San Francisco, CA (US)

(72) Inventor: Patrick James Helland, San Francicso, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/851,387

(22) Filed: Apr. 17, 2020

(65) Prior Publication Data

US 2020/0250155 A1 Aug. 6, 2020

Related U.S. Application Data

(63) Continuation of application No. 14/526,211, filed on Oct. 28, 2014, now abandoned.

(51) Int. Cl.
  *G06F 16/21* (2019.01)
  *G06F 16/27* (2019.01)
  *G06F 16/25* (2019.01)

(52) U.S. Cl.
  CPC ............ *G06F 16/214* (2019.01); *G06F 16/21* (2019.01); *G06F 16/256* (2019.01); *G06F 16/27* (2019.01)

(58) Field of Classification Search
  CPC ...... G06F 16/214; G06F 16/21; G06F 16/256; G06F 16/27
  USPC .................................................... 707/634
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose |
| 5,761,419 A | 6/1998 | Schwartz |
| 5,819,038 A | 10/1998 | Carleton |
| 5,821,937 A | 10/1998 | Tonelli |
| 5,831,610 A | 11/1998 | Tonelli |
| 5,873,096 A | 2/1999 | Lim |
| 5,918,159 A | 6/1999 | Fomukong |
| 5,963,953 A | 10/1999 | Cram |
| 6,092,083 A | 7/2000 | Brodersen |

(Continued)

*Primary Examiner* — Pierre M Vital
*Assistant Examiner* — Andrew N Ho
(74) *Attorney, Agent, or Firm* — Butzel Long; Donald J. Lecher

(57) ABSTRACT

In accordance with embodiments, there are provided mechanisms and methods for facilitating dynamically unified system of record in an on-demand services environment in a multi-tenant environment according to one embodiment. In one embodiment and by way of example, a method includes integrating, by and incorporating into the database system, a plurality of subsystems into a unified system of record ("unified system), where each subsystem is independent of and incompatible with other subsystems of the plurality of subsystems, and collectively managing the plurality of subsystems, where collectively managing includes facilitating common communication within and between and uniform management of the plurality of subsystems based on common communication criteria and unified storage of data associated with the plurality of subsystems.

22 Claims, 12 Drawing Sheets

(56) References Cited

U.S. PATENT DOCUMENTS

| | | |
|---|---|---|
| 6,169,534 B1 | 1/2001 | Raffel |
| 6,178,425 B1 | 1/2001 | Brodersen |
| 6,189,011 B1 | 2/2001 | Lim |
| 6,216,135 B1 | 4/2001 | Brodersen |
| 6,233,617 B1 | 5/2001 | Rothwein |
| 6,240,416 B1 | 5/2001 | Immon |
| 6,266,669 B1 | 7/2001 | Brodersen |
| 6,295,530 B1 | 9/2001 | Ritchie |
| 6,324,568 B1 | 11/2001 | Diec |
| 6,324,693 B1 | 11/2001 | Brodersen |
| 6,336,137 B1 | 1/2002 | Lee |
| D454,139 S | 3/2002 | Feldcamp |
| 6,367,077 B1 | 4/2002 | Brodersen |
| 6,393,605 B1 | 5/2002 | Loomans |
| 6,405,220 B1 | 6/2002 | Brodersen |
| 6,434,550 B1 | 8/2002 | Warner |
| 6,446,089 B1 | 9/2002 | Brodersen |
| 6,535,909 B1 | 3/2003 | Rust |
| 6,549,908 B1 | 4/2003 | Loomans |
| 6,553,563 B2 | 4/2003 | Ambrose |
| 6,560,461 B1 | 5/2003 | Fomukong |
| 6,574,635 B2 | 6/2003 | Stauber |
| 6,577,726 B1 | 6/2003 | Huang |
| 6,601,087 B1 | 7/2003 | Zhu |
| 6,604,117 B2 | 8/2003 | Lim |
| 6,604,128 B2 | 8/2003 | Diec |
| 6,609,150 B2 | 8/2003 | Lee |
| 6,621,834 B1 | 9/2003 | Scherpbier |
| 6,654,032 B1 | 11/2003 | Zhu |
| 6,665,648 B2 | 12/2003 | Brodersen |
| 6,665,655 B1 | 12/2003 | Warner |
| 6,684,438 B2 | 2/2004 | Brodersen |
| 6,711,565 B1 | 3/2004 | Subramaniam |
| 6,724,399 B1 | 4/2004 | Katchour |
| 6,728,702 B1 | 4/2004 | Subramaniam |
| 6,728,960 B1 | 4/2004 | Loomans |
| 6,732,095 B1 | 5/2004 | Warshavsky |
| 6,732,100 B1 | 5/2004 | Brodersen |
| 6,732,111 B2 | 5/2004 | Brodersen |
| 6,754,681 B2 | 6/2004 | Brodersen |
| 6,763,351 B1 | 7/2004 | Subramaniam |
| 6,763,501 B1 | 7/2004 | Zhu |
| 6,768,904 B2 | 7/2004 | Kim |
| 6,782,383 B2 | 8/2004 | Subramaniam |
| 6,804,330 B1 | 10/2004 | Jones |
| 6,826,565 B2 | 11/2004 | Ritchie |
| 6,826,582 B1 | 11/2004 | Chatterjee |
| 6,826,745 B2 | 11/2004 | Coker |
| 6,829,655 B1 | 12/2004 | Huang |
| 6,842,748 B1 | 1/2005 | Warner |
| 6,850,895 B2 | 2/2005 | Brodersen |
| 6,850,949 B2 | 2/2005 | Warner |
| 7,289,976 B2 | 10/2007 | Kihneman |
| 7,340,411 B2 | 3/2008 | Cook |
| 7,620,655 B2 | 11/2009 | Larsson |
| 8,805,793 B2 * | 8/2014 | Patiejunas ......... G06F 16/24554 707/687 |
| 9,678,968 B1 | 6/2017 | Taylor |
| 2001/0039550 A1 * | 11/2001 | Putzolu ............... G06F 21/6227 |
| 2001/0044791 A1 | 11/2001 | Richter |
| 2002/0022986 A1 | 2/2002 | Coker |
| 2002/0029161 A1 | 3/2002 | Brodersen |
| 2002/0029376 A1 | 3/2002 | Ambrose |
| 2002/0035577 A1 | 3/2002 | Brodersen |
| 2002/0042264 A1 | 4/2002 | Kim |
| 2002/0042843 A1 | 4/2002 | Diec |
| 2002/0072951 A1 | 6/2002 | Lee |
| 2002/0082892 A1 | 6/2002 | Raffel |
| 2002/0129352 A1 | 9/2002 | Brodersen |
| 2002/0140731 A1 | 10/2002 | Subramaniam |
| 2002/0143997 A1 | 10/2002 | Huang |
| 2002/0152102 A1 | 10/2002 | Brodersen |
| 2002/0161734 A1 | 10/2002 | Stauber |
| 2002/0162090 A1 | 10/2002 | Parnell |
| 2002/0165742 A1 | 11/2002 | Robins |
| 2003/0004971 A1 | 1/2003 | Gong |
| 2003/0018705 A1 | 1/2003 | Chen |
| 2003/0018830 A1 | 1/2003 | Chen |
| 2003/0066031 A1 | 4/2003 | Laane |
| 2003/0066032 A1 | 4/2003 | Ramachadran |
| 2003/0069936 A1 | 4/2003 | Warner |
| 2003/0070000 A1 | 4/2003 | Coker |
| 2003/0070004 A1 | 4/2003 | Mukundan |
| 2003/0070005 A1 | 4/2003 | Mukundan |
| 2003/0074418 A1 | 4/2003 | Coker |
| 2003/0088545 A1 | 5/2003 | Subramaniam |
| 2003/0120675 A1 | 6/2003 | Stauber |
| 2003/0151633 A1 | 8/2003 | George |
| 2003/0159136 A1 | 8/2003 | Huang |
| 2003/0187921 A1 | 10/2003 | Diec |
| 2003/0189600 A1 | 10/2003 | Gune |
| 2003/0191743 A1 | 10/2003 | Brodersen |
| 2003/0204427 A1 | 10/2003 | Gune |
| 2003/0206192 A1 | 11/2003 | Chen |
| 2003/0225730 A1 | 12/2003 | Warner |
| 2004/0001092 A1 | 1/2004 | Rothwein |
| 2004/0010489 A1 | 1/2004 | Rio |
| 2004/0015981 A1 | 1/2004 | Coker |
| 2004/0027388 A1 | 2/2004 | Berg |
| 2004/0030703 A1 | 2/2004 | Bourbonnais |
| 2004/0044705 A1 | 3/2004 | Stager |
| 2004/0128001 A1 | 7/2004 | Levin |
| 2004/0181524 A1 * | 9/2004 | Jardin ..................... G06F 16/27 |
| 2004/0186860 A1 | 9/2004 | Lee |
| 2004/0193510 A1 | 9/2004 | Catahan |
| 2004/0199489 A1 | 10/2004 | Barnes-Leon |
| 2004/0199536 A1 | 10/2004 | Barnes-Leon |
| 2004/0199543 A1 | 10/2004 | Braud |
| 2004/0249854 A1 | 12/2004 | Barnes-Leon |
| 2004/0260534 A1 | 12/2004 | Pak |
| 2004/0260659 A1 | 12/2004 | Chan |
| 2004/0268299 A1 | 12/2004 | Lei |
| 2005/0050555 A1 | 3/2005 | Exley |
| 2005/0091098 A1 | 4/2005 | Brodersen |
| 2007/0162451 A1 | 7/2007 | Becker |
| 2008/0162483 A1 * | 7/2008 | Becker ..................... G06F 16/27 |
| 2008/0183975 A1 * | 7/2008 | Foster ................ G06F 11/1096 711/153 |
| 2009/0037424 A1 * | 2/2009 | Susairaj .............. H04L 67/1097 |
| 2009/0177744 A1 | 7/2009 | Marlow |
| 2009/0193059 A1 | 7/2009 | Wall |
| 2009/0282045 A1 | 11/2009 | Hsieh |
| 2010/0153345 A1 * | 6/2010 | Ginkel ..................... G06F 16/27 707/690 |
| 2011/0071989 A1 * | 3/2011 | Wilson ................ G06F 16/1748 707/692 |
| 2011/0208784 A1 | 8/2011 | Butcher |
| 2012/0016901 A1 * | 1/2012 | Agarwal ............... G06F 16/258 707/769 |
| 2012/0254249 A1 | 10/2012 | Starkey |
| 2012/0254258 A1 | 10/2012 | Gao |
| 2013/0173669 A1 | 7/2013 | Tang |
| 2013/0238562 A1 | 9/2013 | Kumarasamy |
| 2013/0238575 A1 | 9/2013 | Amarendran |
| 2013/0297995 A1 * | 11/2013 | Hayashi ............. G11B 20/1833 714/807 |
| 2014/0046909 A1 * | 2/2014 | Patiejunas ........... G06F 11/1076 707/687 |
| 2014/0279961 A1 | 9/2014 | Schreter |
| 2015/0269390 A1 | 9/2015 | Schaefer |
| 2016/0337365 A1 | 11/2016 | Beiter |

* cited by examiner

FACILITATING DYNAMICALLY UNIFIED SYSTEM OF RECORD IN AN ON-DEMAND SERVICES ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to facilitating dynamically unified system of record in an on-demand services environment.

BACKGROUND

Conventional database systems are designed for single-tenancy. These have been adapted to support multi-tenant solutions by taking single-tenant foundational database technologies and layering support structures on top of them to enable multi-tenancy. Such systems have failed to keep pace with the growth of cloud-based computing and especially multi-tenancy requirements in a cloud-based environment as these conventional systems require special processing and handling for transactions that occur within such a multi-tenant tenant environment. Accordingly, such conventional systems inherently lack harmonious operations when dealing with multi-tenancy and consequently, their management and sustenance is expensive, inefficient, and prone to human errors.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
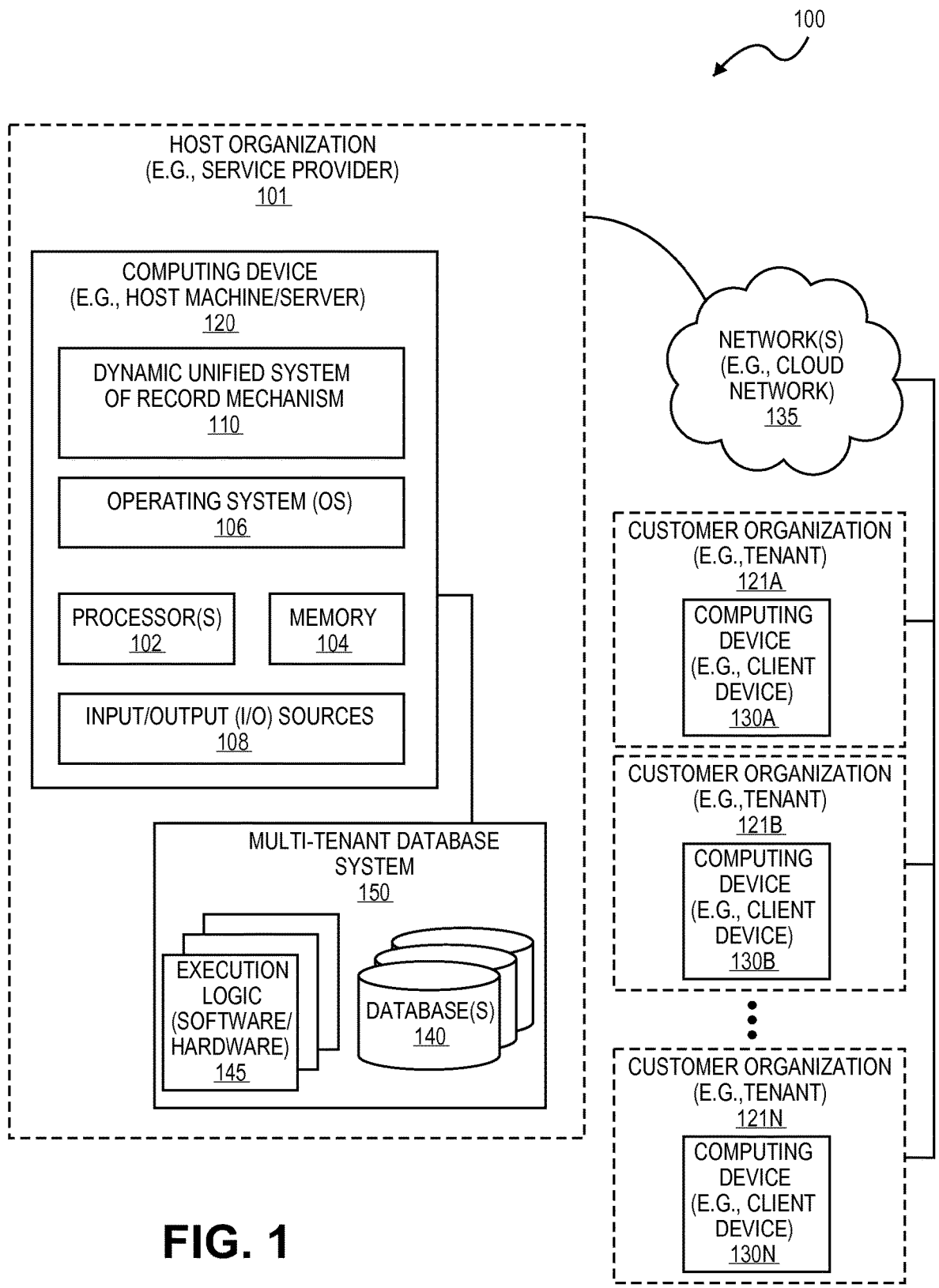
FIG. 1 illustrates a system having a computing device employing a dynamic unified system of record mechanism according to one embodiment.

In accordance with embodiments, there are provided mechanisms and methods for facilitating dynamically unified system of record in an on-demand services environment in a multi-tenant environment according to one embodiment. In one embodiment and by way of example, a method includes integrating, by and incorporating into the database system, a plurality of subsystems into a unified system of record, where each subsystem is independent of and incompatible with other subsystems of the plurality of subsystems, and collectively managing the plurality of subsystems, where collectively managing includes facilitating common communication within and between and uniform management of the plurality of subsystems based on common communication criteria and unified storage of data associated with the plurality of subsystems.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating dynamically unified system of record in an on-demand services environment in a multi-tenant environment according to one embodiment.

Embodiments provide for a unified system of record (also referred to as "unified system", "unified system-of-record", "unified SOR", "integrated system of record", "integrated system", or the like) for integrating any number and type of subsystems into the unified system of record based on simplified manageability and offering robustness over conventional systems. A subsystem may refer to functionalities that are presented to users that need to store data, where a user represents an organization or tenant in a multi-tenant system that is hosted and/or facilitated by a service provider (e.g., Salesforce® or Salesforce.com®). The subsystems will be further illustrated and described with reference to the subsequent figures. The unified system that is capable of integrating any number and type of subsystems is further configured to provide a unified management of and communication within and between the integrated subsystems such that any amount and type of customer/user data associated with these subsystems is managed with utmost care and paramount attention. Stated differently, embodiments provide a unified system of record that is qualified along with providing sufficient safety and protection to serve as a singular system where data associated with any number and type of subsystems is recorded and maintained.

With the increasing number and use of subsystems, such as in a multi-tenant environment, operations and manageability gets increasingly difficult and expensive as large amount and various types of data is added, modified, and/or deleted within these systems and progressively sophisticated tasks are expected to be performed at faster speeds and with high accuracy. Embodiments provide for a unified system to provide a better performance, higher trust, and superior scale, such as using enterprise-class and web-class as standards, embodiments offer a performance that is better than enterprise-class performance over commodity components, a trust that is better than enterprise-class trust, and a class that is superior than web-class scale. Embodiments further provide for and maintain any number of other standards, such as privacy (e.g., customers unable to see other customers' data), availability (e.g., during planned and unplanned power outages), performance (e.g., predictable performance), transparency (e.g., disclosing the truth), and prevention of data loss (e.g., no loss of or corrupt data), etc.

In one embodiment, any number and type of subsystems needing storage are integrated into a single unified system of record. This supports subsystems that may be independent of or incompatible with other subsystems to be dynamically managed via the single unified system. For example and in one embodiment, the subsystem may be offered and efficiently managed using one or more of a unified storage, a unified management system (e.g., backups, high availability application servers, etc.), web scale, commodity-based cost, etc. Similarly, for example and in one embodiment, common communication criteria may be provided to facilitate uniform and seamless communication between the various subsystems despite being independent of and incompatible with each other. Embodiments further provide for facilitating efficient management and uniform communication within the uniform system of record using one or more features or components, such as one or more of extents, fragments, catalog, store, vault, pump, etc.

It is contemplated that embodiments and their implementations are not merely limited to multi-tenant database system ("MTDBS") and can be used in other environment, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a dynamic unified system of record mechanism 110 according to one embodiment. In one embodiment, computing device 120 includes a host server computer serving a host machine for employing dynamic hierarchical queue resource allocation mechanism ("unified mechanism") 110 for facilitating elastic allocation of message queue resources to tenants in a multi-tiered, multi-tenant, on-demand services environment.

It is to be noted that terms like terms like "input", "queue message", "job", "query", "request", and "message" may be referenced interchangeably and similarly, corresponding terms like "input type", "query message type", "job type", "query type", "request type", and "message type" may be referenced interchangeably throughout this document. It is to be further noted that messages may be associated with one or more message types which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host") (e.g., Salesforce®) serving as a host of hierarchical mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document.

Figure 2:
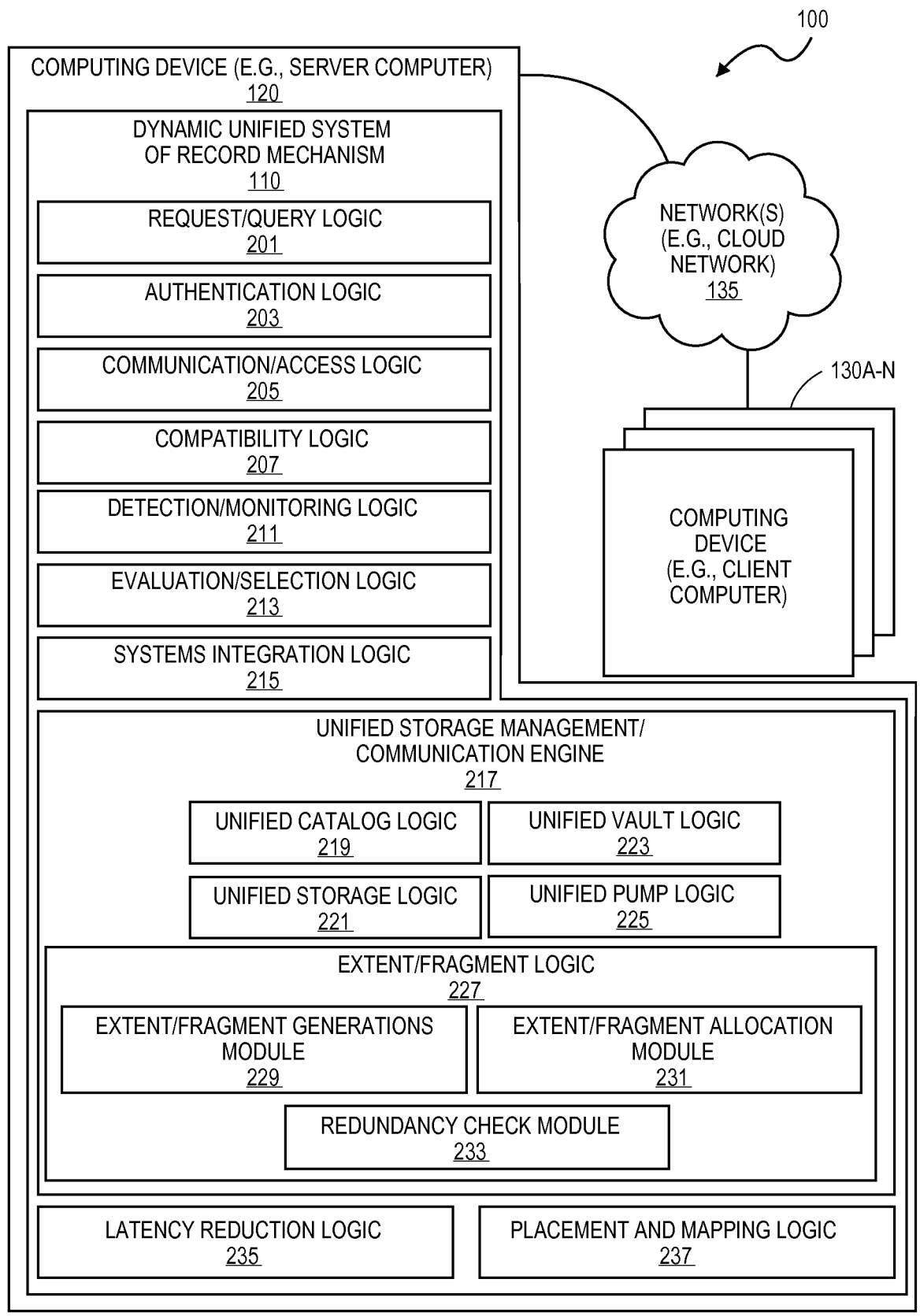
FIG. 2 illustrates a dynamic unified system of record mechanism according to one embodiment.

FIG. 2 illustrates a dynamic unified system of record mechanism 110 according to one embodiment. In one embodiment, unified mechanism 110 may include a number of components, such as (without limitation and not necessarily in this order): request/query logic 201; authentication logic 203; communication/access logic 205; and compatibility logic 207. Unified mechanism 110 may include additional components, such as (without limitation and not necessarily in this order): detection/monitoring logic 211; evaluation/selection logic 213; systems integration logic ("integration logic") 215; unified storage management/communication engine ("unified engine") 217 including unified catalog logic ("catalog logic") 219, unified storage logic ("storage logic") 221, unified vault logic ("vault logic") 223, and unified pump logic ("pump logic") 225; extent/fragment logic 227 including extent/fragment generation module ("generation module") 229, extent/fragment allocation module ("allocation module") 231, and redundancy check module 233; latency reduction logic 235; and placement and mapping logic 237.

Throughout this document, terms like "framework", "mechanism", "engine", "logic", "component", "module", "tool", and "builder" may be referenced interchangeably and include, by way of example, software, hardware, and/or any combination of software and hardware, such as firmware. Further, any use of a particular brand, word, or term, such as "unified" or "integrated", "subsystem", "database", "catalog" or "cataloging", "store" or "storage", "vault" or "vaulting", "pump" or "pumping", "extent", "fragment", "allocation", "registry", etc., should not be read to limit embodiments to software or devices that carry that label in products or in literature external to this document.

As aforementioned, with respect to FIG. 1, any number and type of requests and/or queries may be received at or submitted to request/query logic 201 for processing. For example, incoming requests may specify which services from computing device 120 are to be provided, such as query requests, search request, status requests, database transactions, graphical user interface requests and interactions, processing requests to retrieve, update, or store data, etc., on behalf of one or more client devices 130A-N, code execution requests, and so forth.

In one embodiment, computing device 120 may implement request/query logic 201 to serve as a request/query interface via a web server or as a stand-alone interface to receive requests packets or other requests from the client devices 130A-N. The request interface may further support the return of response packets or other replies and responses in an outgoing direction from computing device 120 to one or more client devices 130A-N.

Similarly, request/query logic 201 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 203 may operate on behalf of the host organization, via computing device 120, to verify, authenticate, and authorize, user credentials associated with users attempting to gain access to the host organization via one or more client devices 130A-N.

In one embodiment, communication/access logic 205 is used to facilitate communication not only between various components of unified mechanism 110, but also between other components, services, software development tools, databases, data processing devices, application servers, architectures, platforms, etc. For example, communication/access logic 205 may facilitate communication between computing device 120 and computing device(s) 130A-N over network(s) 135 and similarly, with and between database(s) 140, etc. Further, for example, communication/access logic 205 may work with other components, such as request/query logic 201, authentication logic 203, etc., to assist their tasks. Compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 120 is further shown to be in communication with any number and type of other computing devices, such as client computing device(s) 130A-N, over one or more networks, such as network(s) 140.

As aforementioned, embodiments provide for an integration of any number and type of subsystems (e.g., database systems, platforms, relational databases, etc.) that are independent of and/or incompatible with each other into a single unified system of record which is managed and operated in a unified manner by providing unified forms tasks, such as unified management, unified communication, unified storage, etc. It is contemplated and to be noted that these subsystem that are integrated into a single unified system are independent of and incompatible with each other such that they may be incapable of communicating and working with each other outside of embodiments of this unified system of record. For example, these various subsystems that are integrated into a single unified system, according to one embodiment, may include (without limitation) Salesforce® FileForce™, Salesforce® File™, Google® Analytics™, Brightcove™ Dynamic Ingest ("DI") application programming interface ("API"), Apache™ HBase™, Apache™ Hadoop™, Apache™ Solr™, Cisco® secure Access Control Server ("ACS"), etc. Further, for example and in one embodiment, one or more subsystems may include one or more relational databases such that the unified system is capable of integrating, supporting, and managing relational databases along with other integrated subsystems.

It is further contemplated that embodiments are not limited to any particular number or type of subsystem, such as embodiments are not limited to merely those subsystems that independent or incompatible of each other and thus, it is to be noted that in some embodiments, for example, two or more subsystem within the unified system may be compatible and/or capable of communicating with each other. For example, using the exemplary list above, in a unified system, Apache HBase™ and Solr™ may be compatible and capable of communicating with each other or, in some cases, even dependent on each other; however, the same two systems, such as HBase™ and Solr™, may be independent of and incompatible with other subsystems, such as Analytics™, DI API™, etc. As will be described further in this document, in one embodiment, the unified system provides for a unified and seamless management and communication of any number and type of integrated incompatible/independent subsystems within the unified system.

In one embodiment, detection/monitor logic 211 may be used to first detect any number and type of subsystems that may be regarded as candidates to be potentially integrated with each other to form a unified system or other subsystems that are already part of an existing unified system. For example, in some embodiments, request for a new subsystem may be placed with request/query logic 201 which may then be forwarded on to authentication logic 203 to perform any number and type of authentication processes for verification purposes, such as confirm basic identification of the subsystem, subsystem proprietor or service provider, any system administrators associated with the subsystem, etc., as previously mentioned.

Referring back to detection/monitor logic 211, upon authentication by authentication logic 203, the candidate subsystem may be detected by detection/monitor logic 211 and any information relating to the candidate subsystem may then be forwarded on to evaluation/selection logic 213 for further processing. In one embodiment, evaluation/selection logic 213 may be used to evaluate the information received from detection/monitor logic 211 to determine whether the subsystem is suited or befitting to be part of the unified system. For example and in one embodiment, evaluation/selection logic 213 may use predetermined selection criteria to evaluate the candidacy of the subsystem and decide whether it is to be selected to be part of the unified system. For example, the predetermined criteria may include one or more factors, minimum/maximum requirements, etc., such as speed or type of the subsystem, amount or nature of data associated with the subsystem, etc.), and/or the like, that may need to be satisfied before the subsystem may be considered or selected to be part of the unified system. In one embodiment, the candidate subsystem may be selected to be integrated with the unified system or, in another embodiment, rejected from doing so based on, for example, the predetermined criteria.

Upon selection of the subsystem by evaluation/selection logic 213, this decision may then be forwarded on to integration logic 215 for further processing. In one embodiment, integration logic 215 may then integrate the subsystem into the unified system. In one embodiment, integration logic 215 may generate a new unified system where the candidate subsystem may be one of several subsystems to be integrated into creating the new unified system. In another embodiment, the unified system may already be existence and performing its tasks such that in this case, this subsystem may be added to or integrated with the pool of other already existing subsystems of the existing unified system as facilitated by integration logic 215.

In one embodiment, being one of the subsystems of the unified mechanism, the subsystem along with other subsystems may perform their tasks despite being incompatible with and/or independent of each other. In one embodiment, this unified management and seamless communication within the unified system is facilitated and performed using unified engine 217 and its various components, such as components.

In one embodiment, as further described and illustrated with reference to FIG. 3A, the subsystems and their contents (e.g., data, metadata, etc.) may be cataloged into a unified catalog, such as unified catalog 313 of FIG. 3A, using catalog logic 219. For example, as will be further described in this document, unified catalog may be used to maintain and preserve identities of extents, such as extent 323 of FIG. 3A, which may be uniquely assigned or allocated a named with a globally unique identifier ("GUID") (e.g., extent-ID) by the unified catalog. Further, the unified catalog may be used to understand and identify naming system for each subsystem and their subsystems, such as subsystems 321A-E of FIG. 3A. For example, the unified catalog may be used to manage and perform any number and type of tasks, such as managing one or more of data recovery for subsystems, unified vault, splits, migrations, and capacity changes, etc., as well as one or more of physical server computers, disks, data capacities, etc. Similarly, the unified catalog may be further used for directing copying or duplicating of data for any number of operation needs.

Figure 3A:
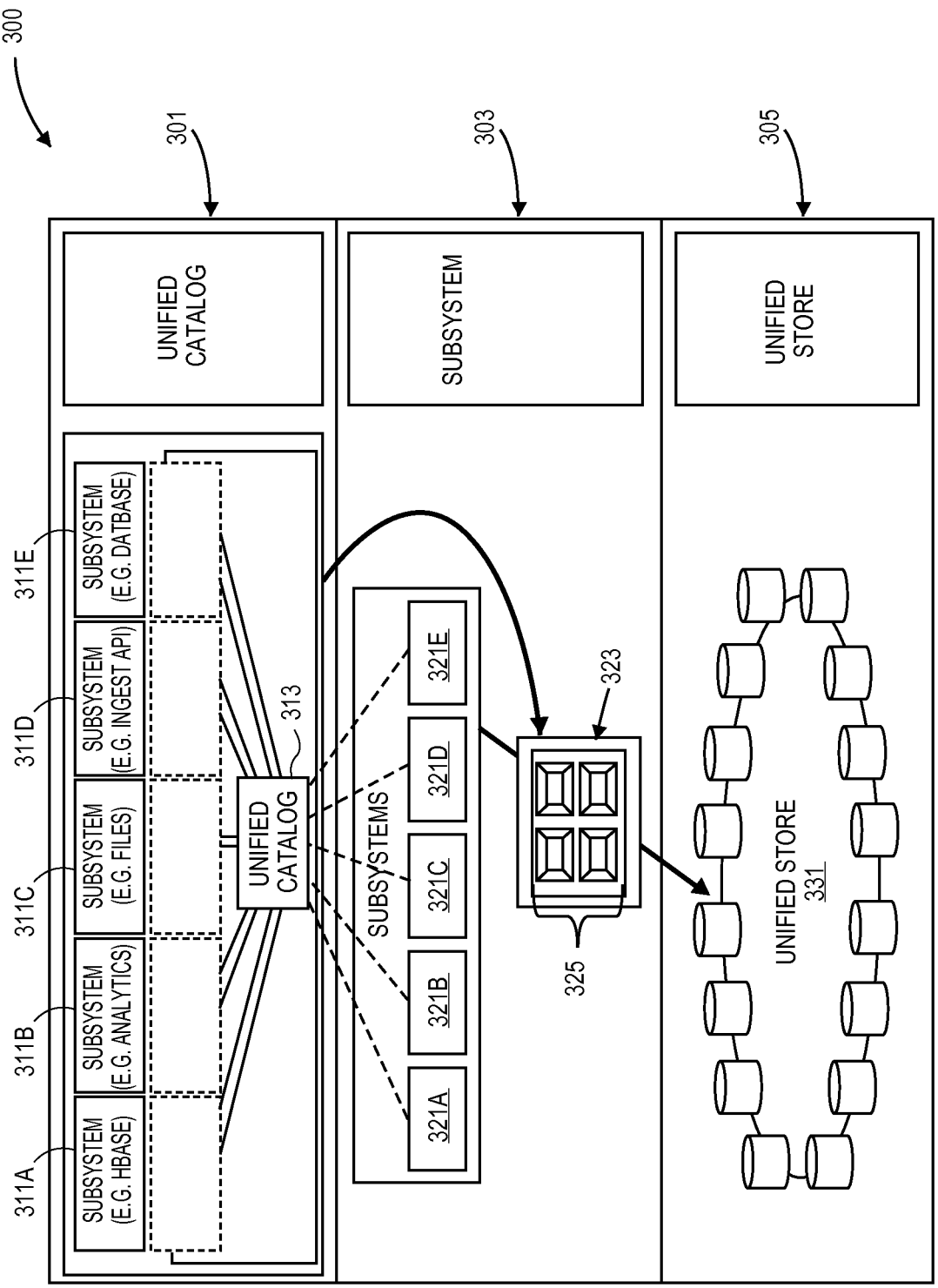
FIG. 3A illustrates a unified system of record using the dynamic unified system of record mechanism of FIG. 2 according to one embodiment.

Continuing with unified engine 217, in one embodiment, storage logic 221 may be used to facilitate a unified storage, such as unified store 331 of FIG. 3A, to store and maintain data, metadata, etc., relating to each of the subsystems of the unified system of record. For example, the unified store may be used to maintain fragments that are contained within extents in a cluster of servers, such as application servers. Further, for example, the unified store may automatically support high availability and load distribution per pod per datacenter. As will be further described and illustrated with reference to FIG. 3A, in one embodiment, while the unified catalog may hold and maintain consistent metadata that describes extent-IDs to use, the unified store may hold and maintain fragments contained within their corresponding extents that are described the unified catalog.

Moreover, in some embodiments, the unified store, as facilitated by store logic 221, may store and maintain immutable data of a wide range, such as (without limitation) user files, application blobs, key-value logging, key-value Log Structured Merge ("LSM") data extents, and big data analytics, etc. For example, using aforementioned examples of subsystems, these data/metadata may include blobs by reference or inside relational database using FireForce™, big analytics data sets using Analytics™, user files and directories in cloud using Files™, user files and buckets and user uploads/downloads using DI API, key-value data and high performance key value using HBase™, and/or the like.

In one embodiment, unified engine 217 further includes vault logic 223 to provide and facilitate the user of a unified vault, such as unified vault to automatically and dynamically retain any amount and type of data and/or metadata relating to each of the subsystems of the unified system for any amount or period of time (e.g., 90 days, 30 days, 1 year, etc.) after its deletion. It is contemplated that embodiments are not limited to any particular period of time and that 90 days or any other period of time is merely used as an example for brevity and ease of understanding. Further, in one embodiment, the period of time may be dynamically changed based on real-time and/or historical information and/or as predetermined by a system administrator based on the same real-time/historical information and/or as desired or necessitated and as such, in one embodiment, the unified vault may be different from the unified store.

Further, in one embodiment, pump logic 225 may provide and facilitate the user of a unified pump to perform any number of tasks as, for example, directed by one or more of other components, such as the unified catalog. For example and in one embodiment, as directed by the unified catalog, the keystone pump may efficiently copy extents both from within and across datacenters.

Continuing with unified engine 217, it further includes extent/fragment logic 227 having generation module 229 and allocation module 231. In one embodiment, an extent may be uniquely named with a GUID (e.g., extent-ID) as allocated by the unified catalog. Further, for example, an extent may be used to define and include a bunch of fragments, where the extent is written by a single process in a service provider's subsystem, such as a Salesforce® subsystem. In some embodiments, an extent may be generated, via generation module 229, by seeking a corresponding GUID from the unified catalog; written by writing, via a single process, a sequence of fragments to the unified store; and sealed by informing the unified catalog that the extent and its fragments have been written. Further, each extent may be replicated on and over a number of server computers of the unified store, such as replicated three times on three different unified store servers.

In one embodiment, each extent may have and/or hold one or more fragments, where each fragment may represent an atomic unit of read and write to/from the unified store and have a variable length (e.g., within a maximum limit, such as 1 MB). As with extents, using generation module 229, a fragment may be generated and named with a fragment-ID having the corresponding extent ID and a fragment number (e.g., 32-bit-FragNum, etc.). Fragments may be protected from any corruption by redundancy and verification checks as facilitated by redundancy check module 233 using any number and type of redundancy check techniques, such as cyclic redundancy check ("CRC"). To provide further protection, a fragment may not be allowed to be read until the check is performed as will be further described with reference to FIG. 3E.

It is contemplated that the unified catalog, unified store, unified vault, extents, fragments, etc., may be stored in any manner (e.g., tables, lists, maps, etc.) at any number or type of locations, such as database(s) 140, as will be further described with reference to FIG. 3A. For example and in one embodiment, the unified catalog may be built on and maintained at one or more application servers of multi-tenant database system 150 of FIG. 1 and similarly, the state of extents may be kept and maintained using one or more tables (e.g., structured query language ("SQL") tables, etc.) while the state of the storage servers maintaining the unified store, disks, data layout, etc., may be kept and maintained using a special-purpose programming language, such as SQL. In some embodiments, the relevant application servers, such as those having the unified catalog, may possess a code to process any number and type of request relating to the unified catalog. Further, for example, a single storage server may hold and maintain any number and type of disks, such as 4 TB hard disk drives (HDDs), 750 GB solid-state drive (SSDs), etc., where a pod may have and maintain any number and type of storage nodes, such as tens to hundreds of storage nodes.

Figure 3B:
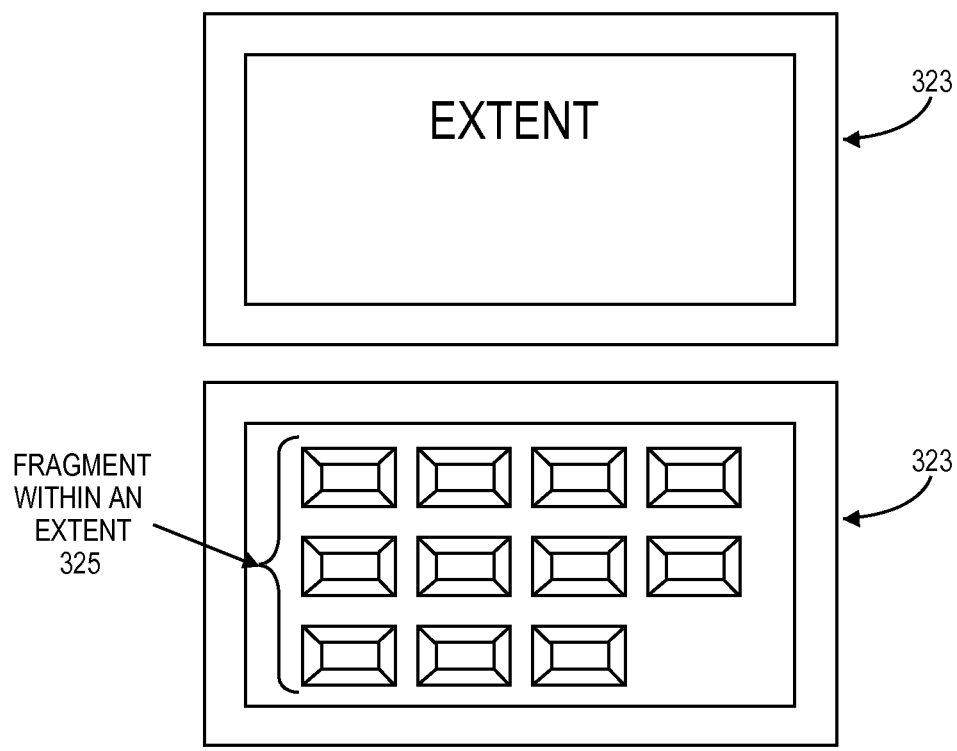
FIG. 3B illustrates an extent and its fragments according to one embodiment.

In one embodiment, redundancy check module 233 may be used to perform redundancy checks on fragments, such as fragments 325 of FIG. 3B, to check for and verify fragment reads and writes associated with the fragments contained within one or more extents. As further illustrated with reference to FIG. 3E, for example and in one embodiment, when a fragment arrives to be written in an extent, its check is performed beforehand using, for example, CRC as facilitated by redundancy check module 233 and as a successful write is acknowledged, the replica is regarded as a good fragment which ensures that the application has, for example, 3 good writes corresponding to the three replicas. As aforementioned, embodiments are not limited to a particular number of writes or replicas, etc.

In one embodiment, using latency reduction logic 235, a response with a fewer writes (e.g., 2 writes, etc.) than the number of issued writes (e.g., 3 writes, etc.) may be used to achieve reduction in latency. In other words, in one embodiment, any delay or latency relating to servers (e.g., replica servers) may be reduced by issuing 3 writes and waiting only for 2 writes before giving a response. It is contemplated that embodiments are not limited to any particular number of writes, but for brevity and simplicity, 3 writes is used to correspond with 3 replicas or replica servers and thus a response of 2 writes (which is less than 3 writes) is shown be accepted and considered sufficient for issuing a response to efficiently reduce latency. For example, in a multi-tenant distributed system having storage on multiple computing servers, the knowledge choice may come down to either where to write the replicas of the data or when the replicas are to be written. Typically, data is written on three servers and thus, a committed or dedicated write is typically regarded as the one that is durable on three servers.

In one embodiment, as is further described and illustrated with reference to FIG. 3F, placement and mapping logic 237 may be used to facilitate the unified catalog to define, create, place, and map the various slots at various server computers. For example, slot-maps may be created and assigned a number by the unified catalog, as facilitated by placement and mapping logic 237, where the number includes an epoch-number (or simply "epoch"), etc. Further, churn and data movement may be planned by the centralized unified catalog as facilitated by placement and mapping logic 237. Further as described and illustrated with reference to FIG. 3G, for example and in one embodiment, placement and mapping logic 237 may be used to strategically place and map any number and type of disks holding data/metadata at multiple server computers of the unified store, such as unified store 305 of FIG. 3A.

It is contemplated that when writing to three prescribed locations (e.g., servers), delay or latency is to be expected, but as it turns out although most servers have a good average response time, but the occasional delays caused by them can be quite onerous. For example, a typical server written in Java® may have a 2 ms response time average with $\frac{1}{1000}$th of the requests taking 200-300 ms and thus, in one embodiment, requiring merely 2 requests out of the expected 3 to complete when doing the work, this very pernicious problem (assuming, for example, the delays are uncorrelated) can be rather easily set aside.

In one embodiment, when dealing with uncorrelated (as opposed to correlated) stalls of replicas, when 2 replicas are durable and a third one is being actively created that meets the data availability, a log write may launch three writes and response commit to the user when merely 2 of the 3 writes have confirmed that they are durable. Thus, durability goals may be met when this technique is combined with an active entry for the third replica (and a replica repair after a crash). In another embodiment, if one or more of the writes to the preferred replicas stall and are not confirmed, other or different servers may be continuously tried until one is found and the task is satisfied. If managed correctly, any statistically tight service-level agreement ("SLA") may be kept while, sometimes, landing the writes in auxiliary replicas.

Are you capturing the notion of great latency via issuing 3 writes and waiting only for 2 before giving a response? It turns out that most servers have good average response time but cause occasional delays that can be quite onerous. For example, a typical server written in Java may have a 2 ms response time average with $\frac{1}{1000}$th of the requests taking 200-300 ms. By only requiring 2 requests out of 3 to complete when doing your work, you can side-step this very pernicious problem (assuming the delays are uncorrelated).

Embodiments provide for immutable fragments with, for example, CRC (e.g., CRC-64) to ensure only good data (with correct ID) is located, while extents and fragments allow for sequential performance and efficient metadata. It is contemplated recovery oriented computing emphasizes quick repair for availability, and the embodiment allows for implementation using commodity hardware. The unified system of record as facilitated by unified mechanism 110 provides for high-level correctness, robustness, and performance. For example, correctness may be achieved by using CRC-64 error detection to make it virtually impossible to get bad reads (e.g., 1 undetected corruption per 7 trillion years at 1 million reads/sec from SSD, etc.), robustness may be provided via triple replication with lazy movement of fragments to ensure availability, and performance may be achieved by caching of these immutable fragments using plenty of inexpensive SSDs for log writes, random reads, etc.

It is contemplated that any number and type of components may be added to and/or removed from unified mechanism 110 to facilitate various embodiments including adding, removing, and/or enhancing certain features. It is contemplated that embodiments are not limited to any particular technology, topology, system, architecture, and/or standard and are dynamic enough to adopt and adapt to any future changes.

FIG. 3A illustrates a unified system of record 300 using the dynamic unified system of record mechanism 110 of FIG. 2 according to one embodiment. It is to be noted that for brevity, clarity, and ease of understanding, many of the components and processes described with respect to FIGS. 1-2 may not be repeated or discussed hereafter. In the illustrated embodiment, as discussed with reference to FIG. 2, any number and type of subsystems 311A-E have been integrated and unified into unified system 300. As is further illustrated, in first tier 301, these integrated subsystems 311A-E are unified and collectively managed using one or more unifying techniques of FIG. 2, such as unified catalog 313. In on embodiment, unified catalog 313 facilitates consistency in management and seamlessly perform any number and type of tasks to continue to maintain collective and consistence management of data and/or metadata of subsystems 311A-E, where such tasks may include (without limitation) capturing data identity relating to subsystems 321A-E and managing one or more of data/metadata in terms of replication, backup, restoration, split, migration, etc.

In one embodiment, subsystems 311A-E of first tier 301 are the same as subsystems 321A-E of second tier 303. For example and in one embodiment, subsystems 311A-E are integrated a single unified system 300 and these subsystems 311A-E are then cataloged, via unified catalog 313, into the cataloged subsystems 321A-E. Accordingly, it is to be contemplated that although subsystems 311A-E and 321A-E may be the same in terms of their characteristics, their contents, etc., but they are referenced and shown separately here to illustrate a distinction between the pre-catalog subsystems 311A-E of first tier 301 and the post-catalog subsystems 321A-E of second tier 303. Further, for example and in one embodiment, subsystem 311E, 321E may include a relational database so unified system 300 is capable of supporting and managing relational databases along with other subsystems 311A-D, 321A-D.

As illustrated, in one embodiment, seamless and harmonious communication between various components, such as subsystems 311A-E, subsystems 321A-E, unified store 331, etc., of unified system 300 via one or more communication techniques based on, for example, extents and their fragments, such as extent 323 and its fragments 325. As previously discussed with reference to FIG. 2, a single writer process may be provided per extent 323 to provide immutable extents and/or fragments, such as extent 323 and fragments 325. Further, extent 323 provides for an extensible extent format and various read-only extent-IDs and/or fragment-IDs may be used as extracted or obtained from unified catalog 313. As illustrated, in one embodiment, the integrated system records 311A-E are shown to be in communication with their corresponding subsystems 321A-E using, for example, a consistent and unified naming system, etc., via unified catalog 313 at first tier 301 and extent 323 and fragments 325 at second tier 303 (such as communicating extent-ID, fragment-ID, etc., by unified catalog 313, etc.) and further down to unified store 331 at third tier 305, as illustrated by arrows.

At third tier 305, in one embodiment, a scalable and highly-available fragment unified store 331 is provided, where seamless communication between various storage units at unified store 312 and components at other tiers 301, 303 is facilitated via, for example, read-only extent-IDs and fragment-IDs, etc. As previously discussed, CRC (e.g., CRC-64) checks may be performed on fragments, fragment-IDs, etc. It is contemplated and to be noted that embodiments are not limited to any particular number or type of subsystems 311A-E, subsystems 321A-E, extent 323, fragments 325, unified catalog 313, unified store 331, etc. For example, merely one extent 323 having four fragments 325 is shown, but embodiments are not limited as such and that any number and type of extents containing any number and type of fragments may be employed along with any number and type of subsystems, etc.

FIG. 3B illustrates an extent 323 and its fragments 325 according to one embodiment. It is to be noted that for brevity, clarity, and ease of understanding, many of the components and processes described with respect to FIGS. 1-2 may not be repeated or discussed hereafter. As illustrated, in one embodiment, any number of extents, such as extent 323, may be employed and used along with being uniquely named, such as with a GUID (e.g., extent-IDs) as allocated by unified catalog, such as unified catalog 313 of FIG. 3A. As described with reference to FIG. 2, extent 323 may be created (e.g., asking the unified catalog for a GUID), written (e.g., writing a sequence of fragments, such as fragments 325, to the unified store, such as unified store 331 of FIG. 3A), and sealed (e.g., informing the unified catalog that extent 323 and its fragments 325 are written). Further, extent 323 may be replicated together to the same store servers, such as at unified store 331 of FIG. 3A.

In the illustrated embodiment, fragments 325 are shown to be included in extent 323, where each fragment 325 represents an atomic unit of read and/or write to the unified store. As with extent 323, each fragment 325 is uniquely named using fragment-ID as obtained from the unified catalog. Further, fragments 325 are protected from corruption by using CRC checks (so that no wrong fragment may be read).

Figure 3C:
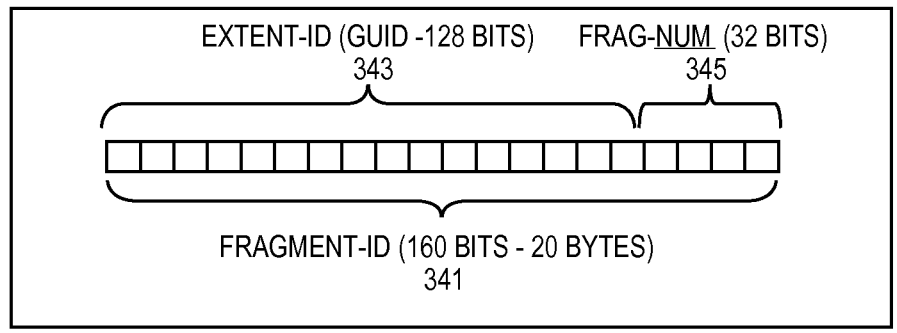
FIG. 3C illustrates a fragment-ID including a combination of an extent-ID and a fragment-number according to one embodiment.

Now referring to FIG. 3C, in one embodiment, it illustrates fragment-ID 341 including a combination of extent-ID 343 and fragment-number ("frag-num") 345. As illustrated, for example, fragment-ID 341 may be made of or spread over 160 bits or 20 bytes, extent-ID 343 includes a GUID of 128 bits, and frag-num 345 includes 32 bits. As aforementioned, the unified store, such as unified store 331 of FIG. 3A, may be used to stores these immutable fragments, such as fragments 325 of FIG. 3B, where once a fragment is assigned its contents, it does not get a new value and similarly, fragment-ID 341 may be consistently and indefinitely bound to the same data (until, for example, the data may be deleted).

In some embodiments, extent 323 may be implemented and/or used in any number and type of ways, such as extent 323 may include a classic extent (e.g., Blobs in FileForce™, etc.) as, for example, 3 replicas on HDDs, etc., or as spaced optimized, such as 3 replicas at first and then stored in the unified vault on the same datacenter and reduced to 2 replicas of the data with a tertiary of the metadata. Further, extent 323 may be used for high-performance logging, such as being placed on 3 replicas in SSDs and acknowledged when written on 2 SSDs. Further, extent 323 may be used as a high-performance random read at first and then as a normal extent, where extent 323 may be written to 3 HDD and SSD on a primary server and read from SSD cache, where any SSD failures may cause switching of primary and secondary roles and reclaim space in SSD cache if not a hot extent. Extent 323 may be used to work over metadata of various extents/fragments in a slot, such as across 3 replicas, and the tertiary may have metadata as opposed to data.

Figure 3D:
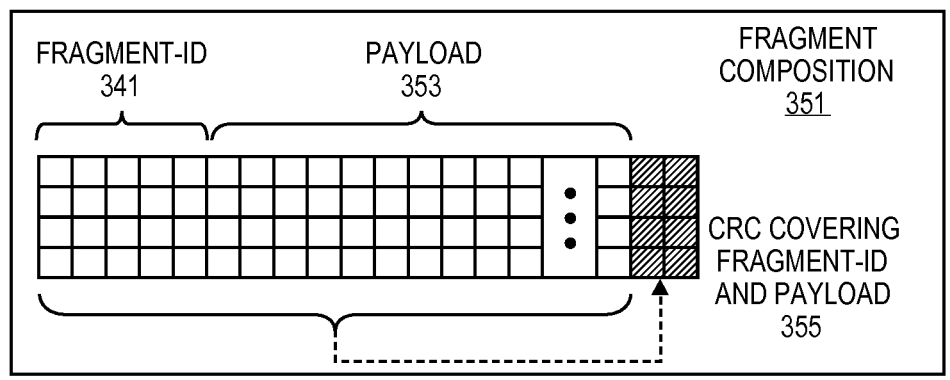
FIG. 3D illustrates a fragment composition according to one embodiment.

FIG. 3D illustrates a fragment composition 351 according to one embodiment. In the illustrated embodiment, fragment composition 351 includes fragment-ID 341 along with payload 353 and CRC 355. In one embodiment, for a given fragment-ID, such as fragment-ID 341, its payload 353 may not change as it may, indefinitely, remain the same which makes fragment payload 353 immutable, where fragment payload 353 may be of a variable length, such as (without limitation) up to 1 MB. Further, in one embodiment, each writing process adds CRC 355 to fragment-ID 341 and its payload 353, where CRC 355 is checked by each store server of the unified store for both reads and writes and each reading process checks CRC 355. This way, in one embodiment, any corrupt data is expected to be rejected by CRC 355, bad data may not be return, and any loss of data is prevented or protected against using multiple replicas of data/metadata at various storage servers of the unified store.

Figure 3E:
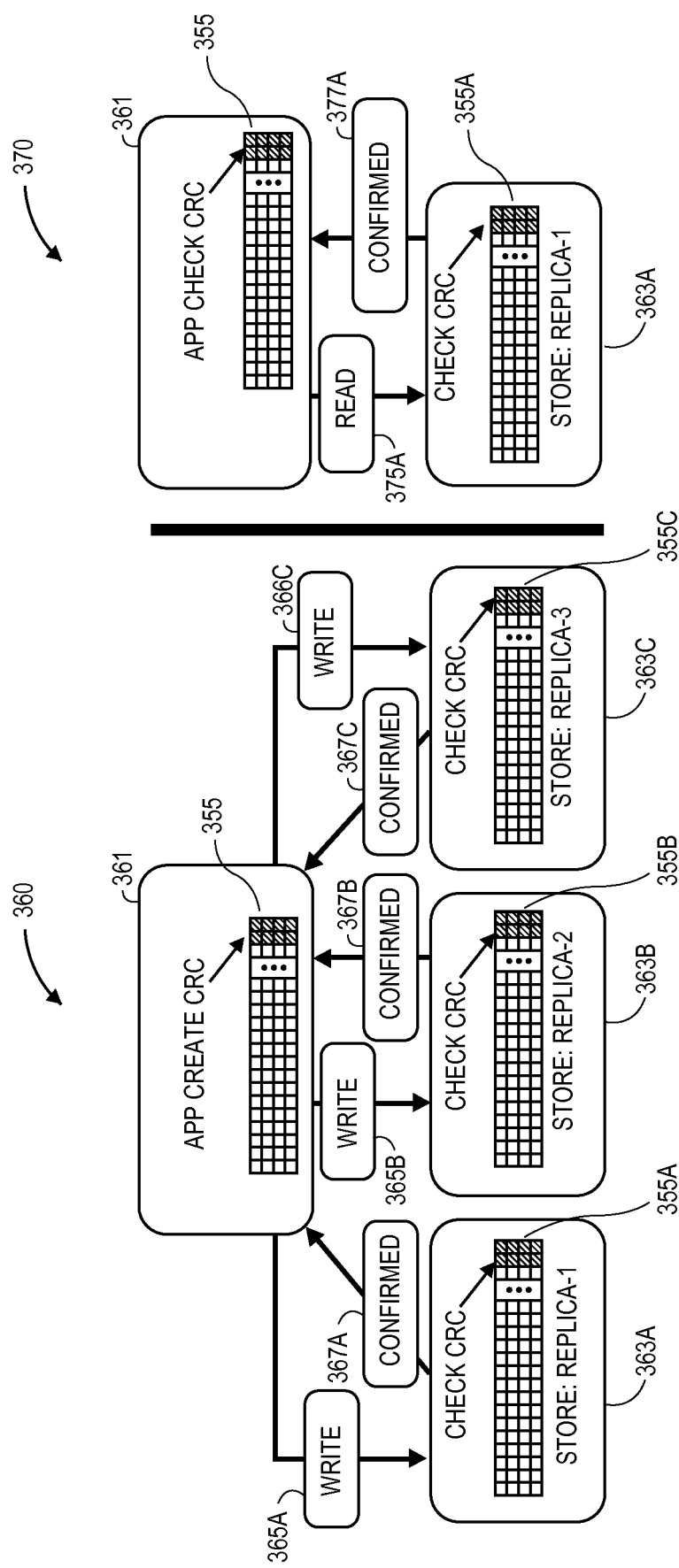
FIG. 3E illustrates correctness checks according to one embodiment.

FIG. 3E illustrates redundancy correctness according to one embodiment. In one embodiment, redundancy check module 233 of FIG. 2 may be used to perform redundancy checks on fragments, such as fragments 325 of FIG. 3B, to check for and verify fragment reads and writes associated with the fragments. For example and in one embodiment, when a fragment arrives to be written in an extent, its check is performed beforehand using, for example, CRC as facilitated by redundancy check module 233 of FIG. 2 and as a successful write is acknowledged, the replica is regarded as a good fragment which ensures that the application has, for example, 3 good writes corresponding to the three replicas. As aforementioned, embodiments are not limited to a particular number of writes or replicas, etc.

For example, as illustrated in FIG. 3E and in one embodiment, in write system 360, prior to or in the process of creating CRC 355 at application 361, application 361 sends write commands 365A-C to each storage server 363A-C of unified store 331 of FIG. 3A where replicas may be generated and/or maintained. Upon receiving write commands 365A-C, CRCs 355A-C corresponding to CRC 355 are verified at each storage server 363A-C and if the checks are successful, confirmations 367A-C are communicated back to application 361 which then proceeds with creating CRC 355.

Similarly, in some embodiments, as a fragment is read from a disk or SSD, etc., its CRC is checked by the user to verify it being correct. For example and as illustrated in read system 370, in one embodiment, application 361 sends read commands, such as read command 375A, to each storage server, such as storage server 363A, of unified store 331 of FIG. 3A where replicas may be generated and/or maintained. Upon receiving read command 375A, one or more corresponding CRCs, such as CRC 355A, is verified at storage server 363A and if the checks are successful, confirmation 377A is communicated back to application 361 which then proceeds with its tasks.

Further, for example, when a fragment is received by an application, its CRC is checked and subsequently, the application may reject the fragment for any number of reasons, such as its fragment-ID mismatches with the fragment-ID that was requested, etc., and similarly, the application may reject a fragment unless its CRC matches.

Figure 3F:
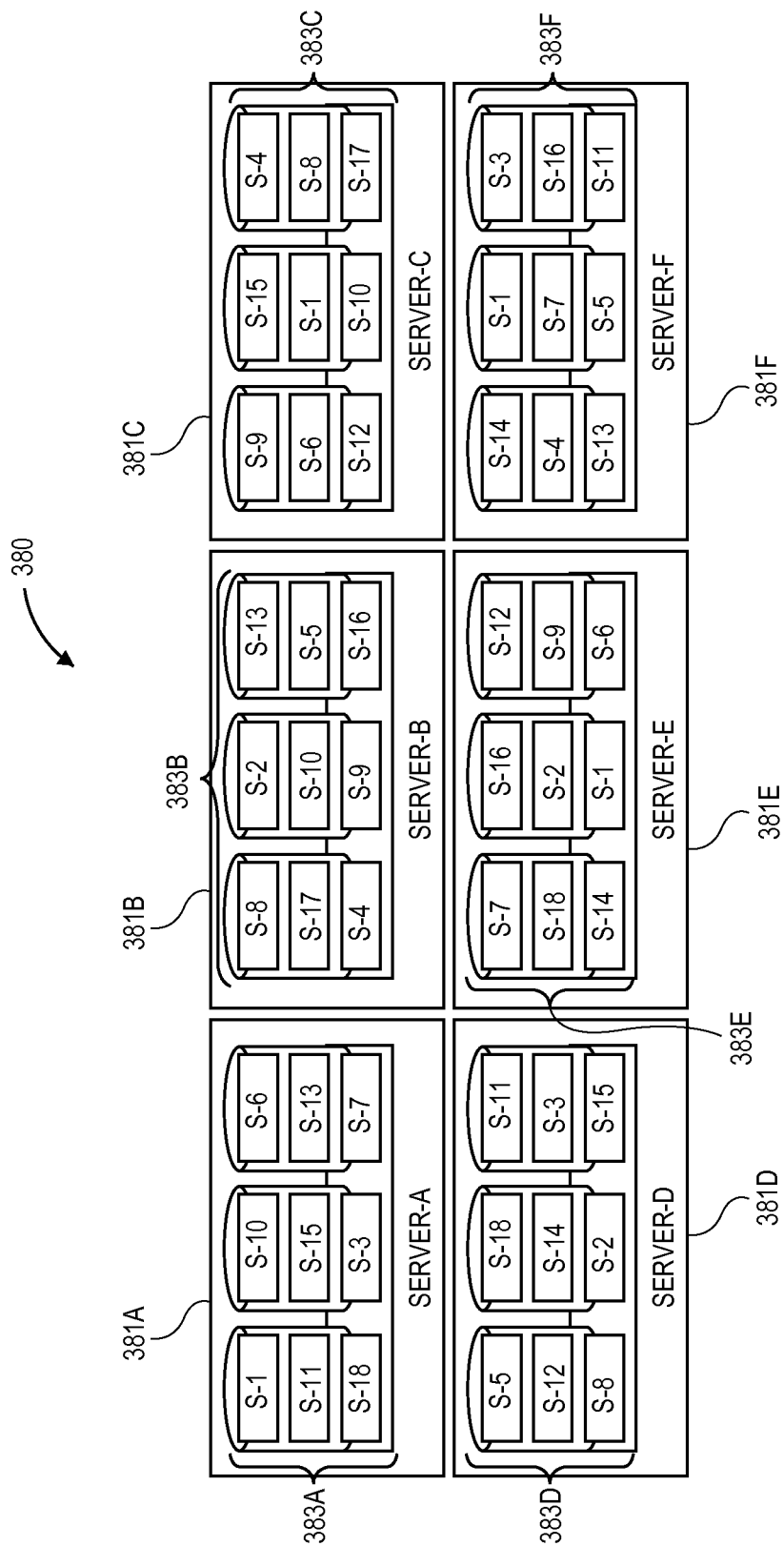
FIG. 3F illustrates management of data slots at multiple server computers according to one embodiment.

FIG. 3F illustrates management of data slots 383A-F at multiple server computers 381A-F according to one embodiment. In one embodiment, various slots 383A-F may be placed and mapped at the unified store, such as unified store 331, and used to hold and maintain ranges of possible extent-IDs as managed by the unified catalog, such as unified catalog 313 of FIG. 3A. In one embodiment, placement and mapping logic 237 of FIG. 2 may be used to facilitate the unified catalog to define, create, place, and map the various slots 383A-F at various server computers 381A-F. For example, slot-maps may be created and assigned a number by the unified catalog, as facilitated by placement and mapping logic 237 of FIG. 2, where the number includes an epoch-number, etc. In one embodiment, the unified catalog may be consistent and centralized, but the epochs may move forward and further, the unified catalog may track when each server computer 381A-F has received a new epoch and processed it. Further, churn and data movement may be planned by the centralized unified catalog as facilitated by placement and mapping logic 237 of FIG. 2. The data may be placed to bound mean-time-to-repair ("MTTP") load on disks, network interfaces, and network switches.

Figure 3G:
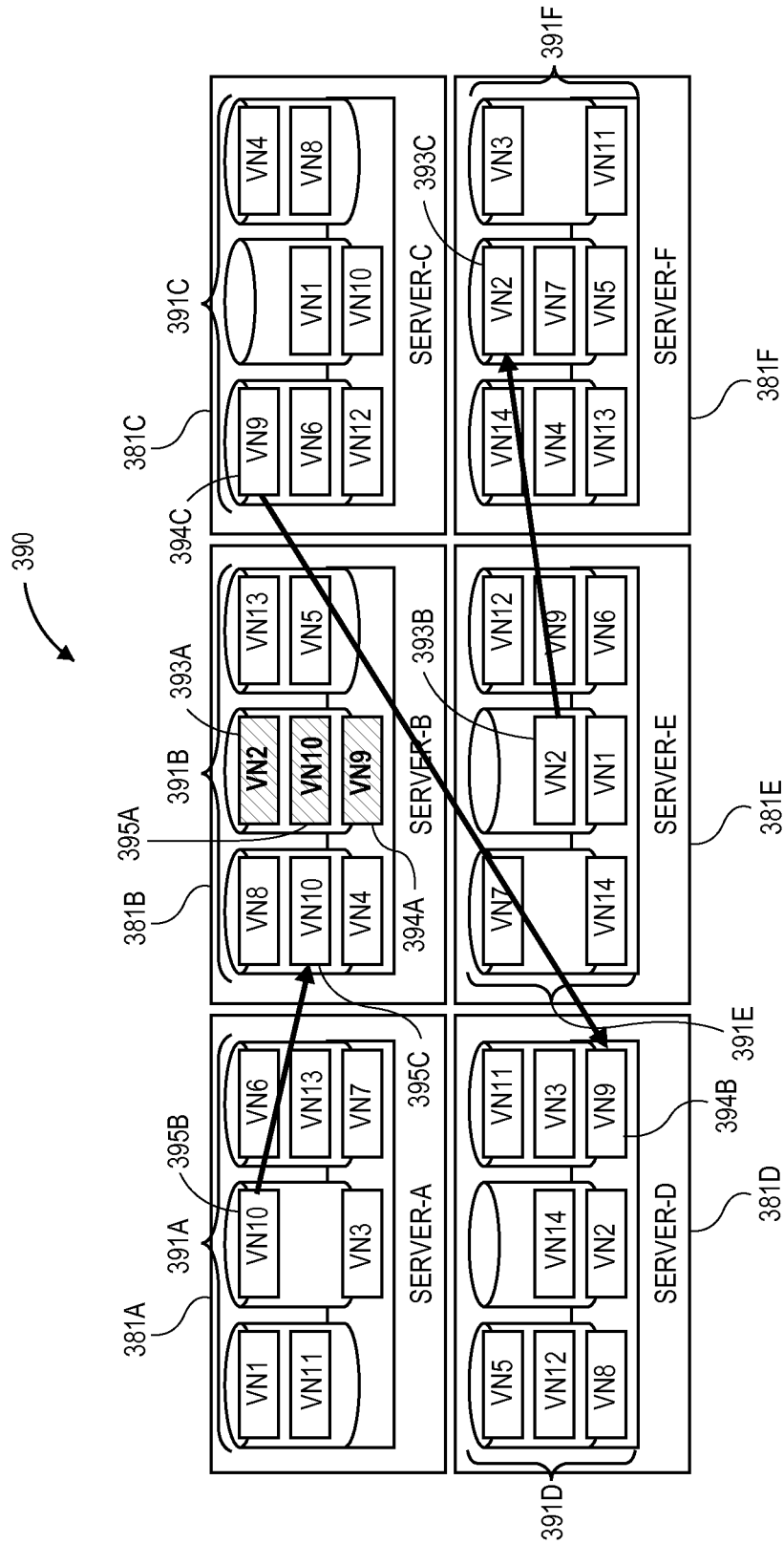
FIG. 3G illustrates management of disks at multiple server computers according to one embodiment to ensure repair of failures by rapidly creating additional replicas.

FIG. 3G illustrates management of disks 391A-F at multiple server computers 381A-F to ensure repair of failures by rapidly creating additional replicas according to one embodiment. In one embodiment, at first, any transient behavior may provide services without the disk, where reads may go to the secondary or tertiary while writes may find another disk to use as the third replica (e.g., Hinted-Handoff, etc.). In one embodiment, placement and mapping logic 237 of FIG. 2 may be used to strategically place and map any number and type of disks 391A-F holding data/metadata at multiple server computers 381A-F of the unified store 305 of FIG. 3A. For example and in one embodiment, storage devices or disks 391A-F may be strategically placed at server computers 381A-F and mapped with each other such that in case of a failed disk, there may be several replicas of the contents (e.g., data, metadata, etc.) of the failed disk available elsewhere for efficient and timely recovery of any contents that may be in danger of being lost due to the failure and thus, contents of disks 391A-F may be spread around for any number of reasons, such as load-balancing, fast repair, etc. In the illustrated embodiment, disk 393A, 394A, 395A at server 381A are shown as being failed, but it is to be noted that, in one embodiment, their contents are safely replicated and available at and capable of being recovered from their corresponding replica disks 393B-C, 394B-C, 395B-C at other servers 381E-F, 381C-D, 381A-B, respectively.

Figure 4:
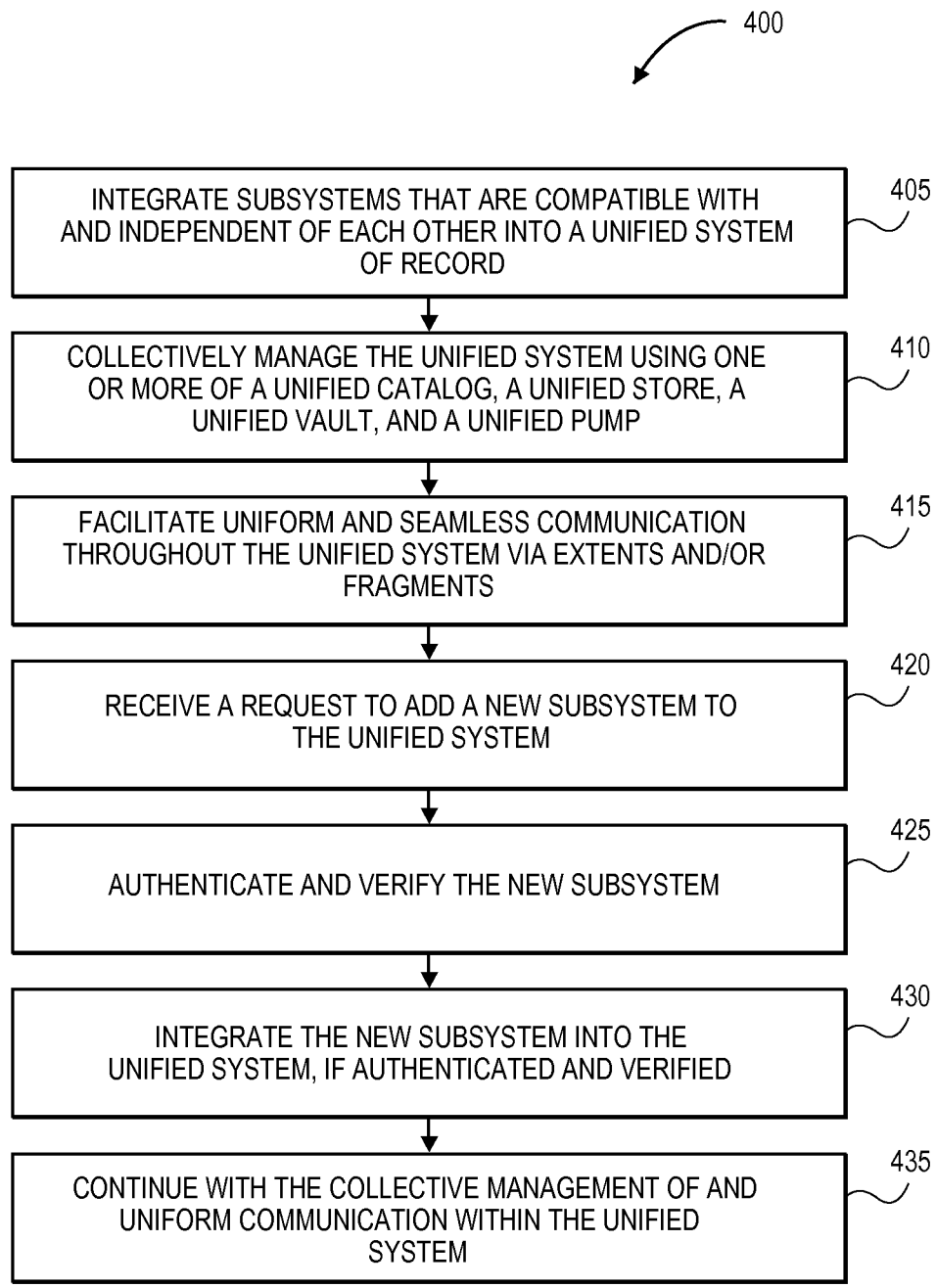
FIG. 4 illustrates a method for facilitating dynamically unified system of record in a multi-tenant environment according to one embodiment.

FIG. 4 illustrates a method 400 for facilitating dynamically unified system of record in a multi-tenant environment according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by unified mechanism 110 of FIGS. 1-2. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Method 400 may begin at block 405 with integration of subsystems that are incompatible with and independent of each other into a unified system of records. As aforementioned, embodiments provide for the unified system to serve as a single system that qualifies as a system where data is recorded and further, it incorporates and provides sufficient safety and protection to be the singular unified system of record. At block 410, in one embodiment, the unified system having the subsystems is collectively managed using one or more of a unified catalog, a unified store, a unified vault, and a unified pump. At block 415, in one embodiment, any communication within and between the subsystems of the unified system is seamlessly facilitated via extents and their fragments.

At block 420, a request to add a new subsystem to the unified system is received. At block 425, the new subsystem is authenticated and verified. At block 430, the new subsystem is added to the unified system by integrating it with the other subsystems of the unified system. It is contemplated that in some embodiments, if the subsystem is incapable of being authenticated or verified, the subsystem is rejected and not integrated with the unified system. At block 435, the unified management of and communication within the unified system is continuously performed, where the unified system now includes the newly-added subsystem along with the originally existing subsystems.

Figure 5:
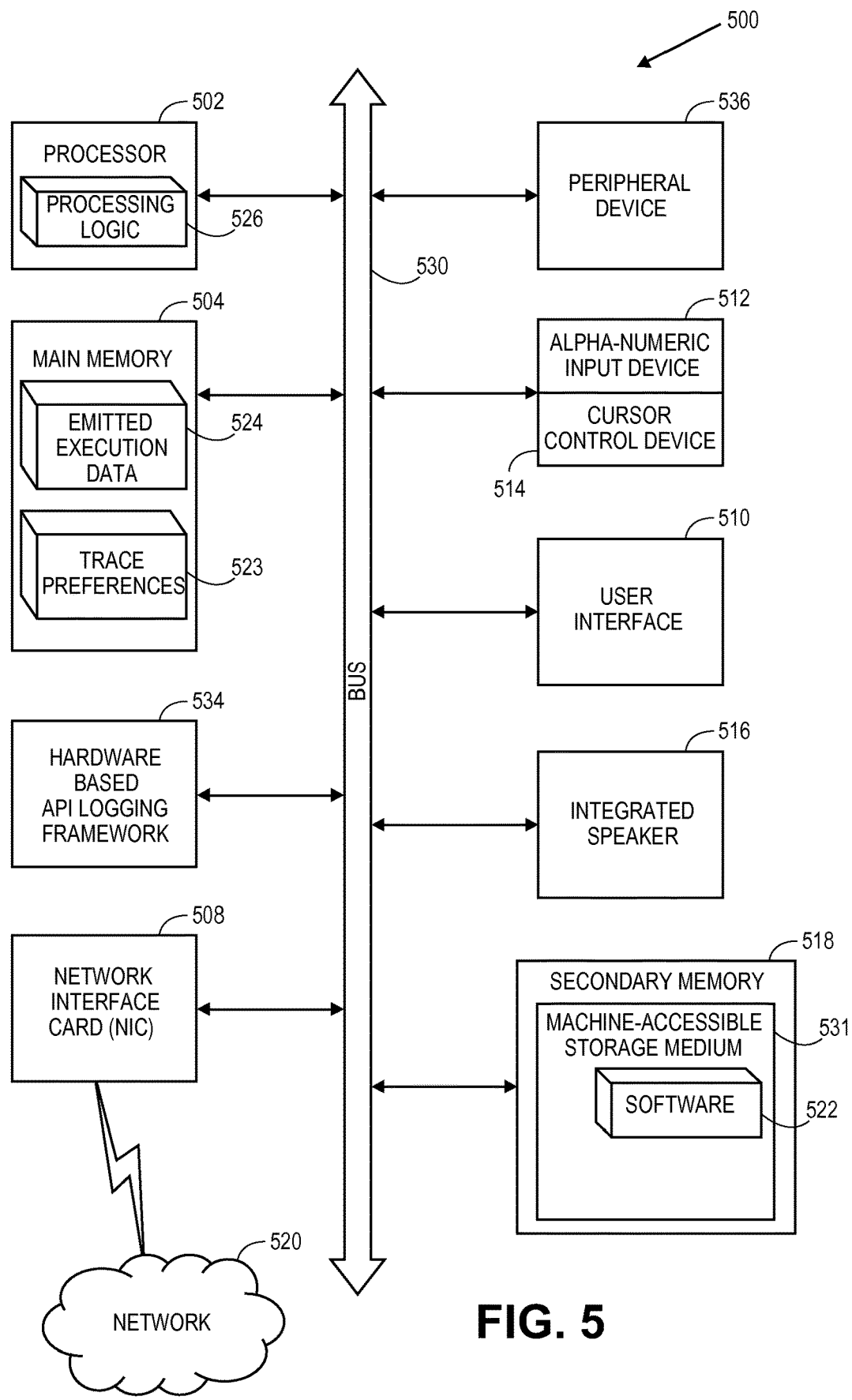
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of unified mechanism 110 as described with reference to FIG. 1 other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of unified mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
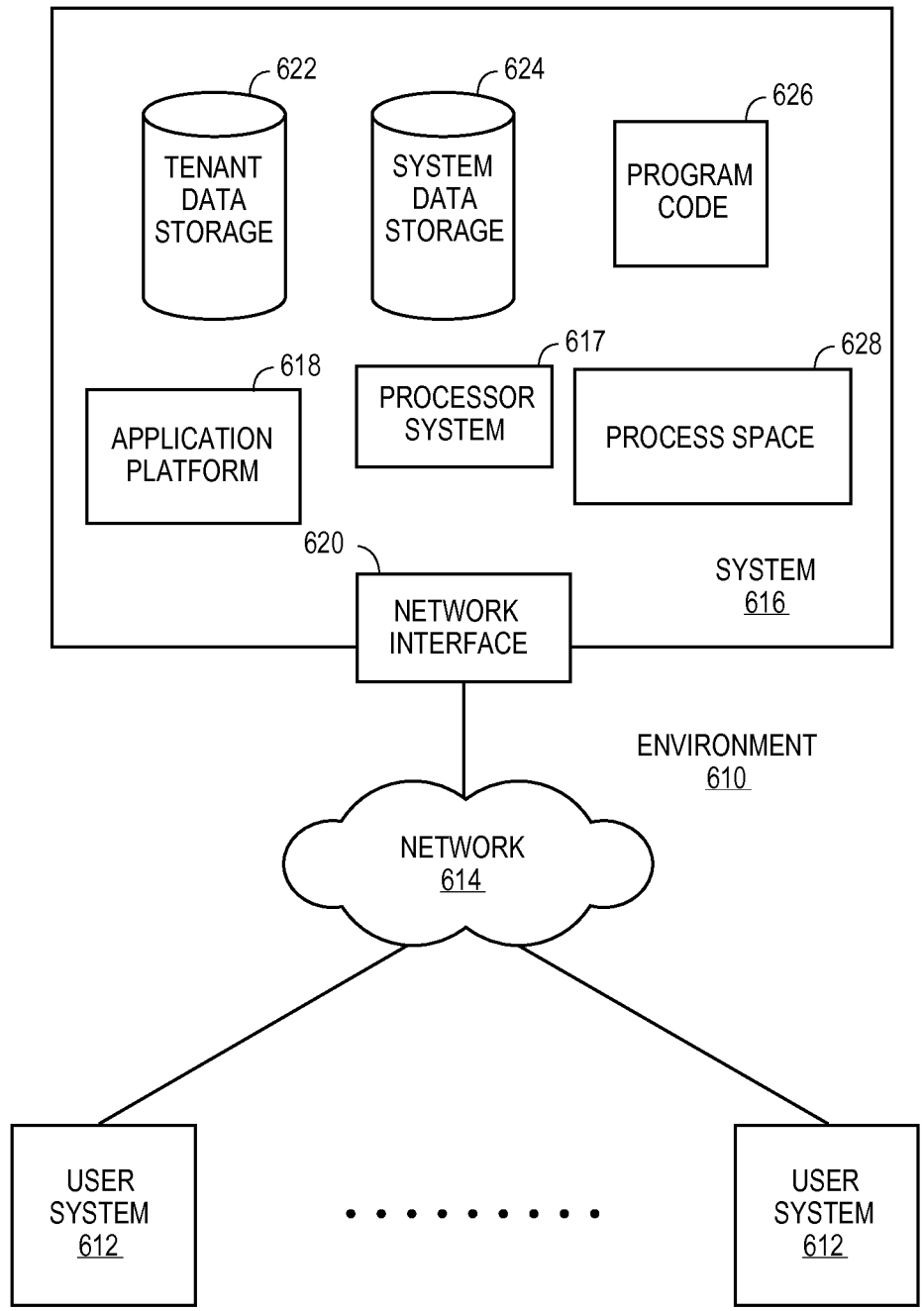
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
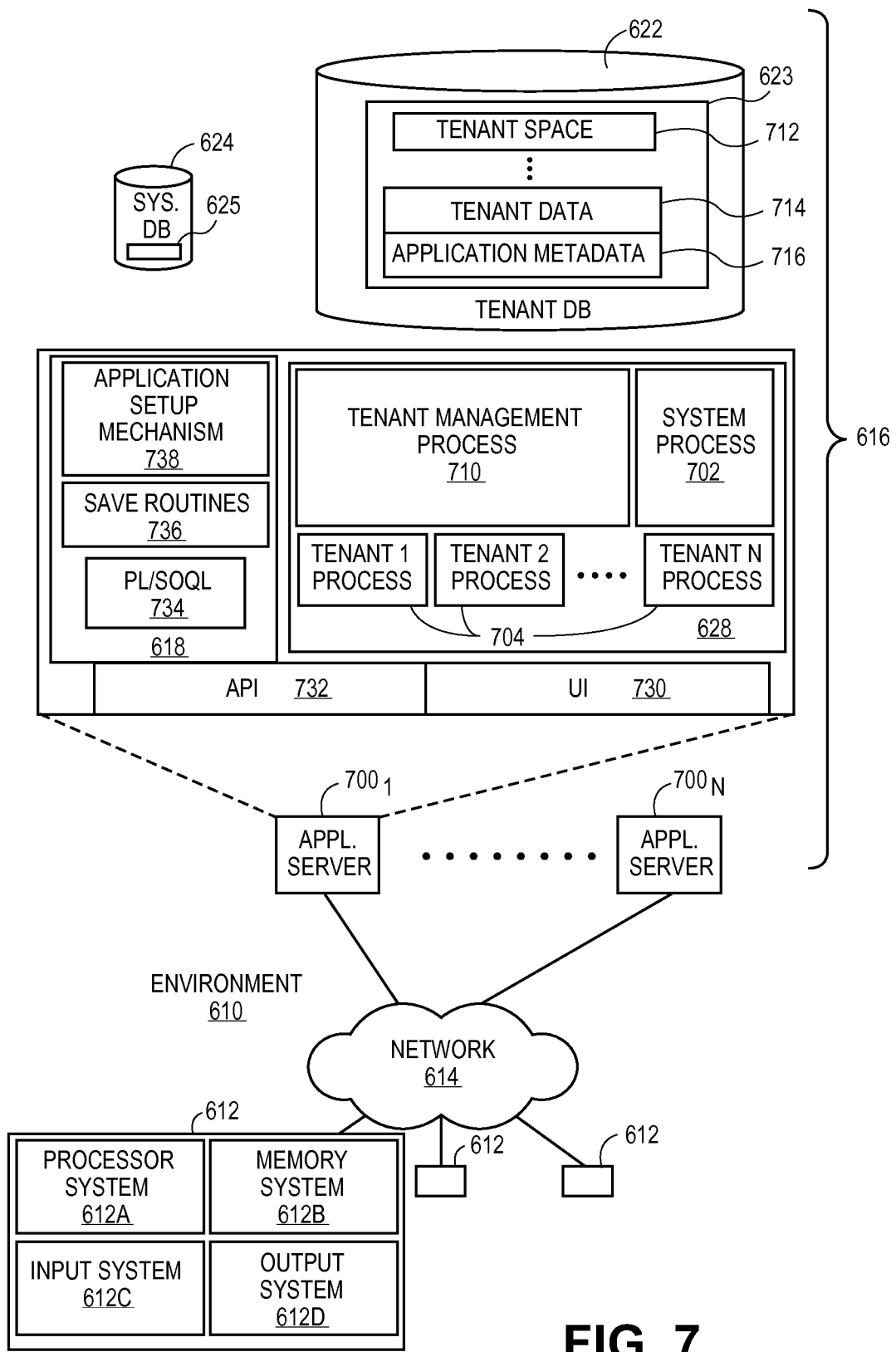
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method comprising:
   providing a plurality of sub-systems each comprising a plurality of un-cataloged sub-system specific records;
   cataloging an un-cataloged sub-system specific record received from one of the plurality of sub-systems by generating a fragment from at least a portion of the sub-system specific record, wherein generating the fragment further comprises
      generating a fragment-ID for the generated fragment, the fragment-ID comprising a global unique extent identifier of a corresponding extent to which the generated fragment is assigned and a fragment number,
      appending the fragment-ID to a payload from the portion of the sub-system specific record, and
      generating check data covering the fragment-ID and the payload and appending the check data to an end of the appended fragment-ID and payload;
   writing the generated fragment to the corresponding extent at a plurality of store servers of a unified store, wherein each of the plurality of store servers contain the corresponding extent with the assigned fragment;
   determining, at each of the plurality of store servers that contain the corresponding extent with the assigned fragment, whether the check data associated with the assigned fragment is correctly written; and
   sending a confirmation from each of the plurality of store servers that contain the corresponding extent with the assigned fragment that the check data associated with the assigned fragment is correctly written.

2. The method of claim 1, wherein the generated fragment represents an atomic unit of one of a read or a write to the plurality of store servers at the unified store.

3. The method of claim 1, wherein the payload is a non-fixed length and is immutably fixed after the generated fragment is assigned to the extent.

4. The method of claim 1, further comprising:
determining, based on the confirmations sent from each of the plurality of store servers that contain the extent with the assigned fragment that the check data associated with the assigned fragment is correctly written, that a replica of the fragment is a non-rejected fragment, thereby ensuring the write command corresponds to the non-rejected fragment.

5. The method of claim 1, wherein the generating the check data that is assigned to the fragment is based on receiving the confirmations sent from each of the plurality of store servers that contain the extent with the assigned fragment that the check data associated with the assigned fragment is correctly written.

6. The method of claim 1, wherein the generating the check data that is appended to the appended fragment-ID and payload is based on receiving confirmations sent from at least one less than the total number of the plurality of store servers that contain the extent with the assigned fragment that the check data associated with the assigned fragment is correctly written.

7. The method of claim 1, further comprising:
checking, at each of the plurality of store servers that contain the extent with the assigned fragment, whether the check data associated with the fragment is incorrectly one of written and read; and
rejecting any fragment on one of the plurality of store servers that contain the extent with the assigned fragment when the check data associated with the fragment determines the fragment was incorrectly one of written and read.

8. The method of claim 7, wherein rejecting any fragment causes at least one of corrupt data to be rejected, bad data to not be returned, or prevention of a loss of data during replication to the plurality of storage servers of the unified store.

9. The method of claim 1, further comprising:
issuing a read command to the plurality of store servers at the unified store, wherein each of the plurality of store servers contain the extent with the assigned fragment; and
checking, at each of the plurality of store servers that contain the extent with the assigned fragment, whether the check data associated with the fragment is correctly read.

10. The method of claim 9, further comprising:
checking, at each of the plurality of store servers that contain the extent with the assigned fragment, whether the check data associated with the fragment is incorrectly read; and
rejecting any fragment on one of the plurality of store servers that contain the extent with the assigned fragment when the check data associated with the fragment determines the fragment was incorrectly read.

11. The method of claim 1, wherein the check data comprises cyclic redundancy check (CRC) data.

12. A unified system of record, the system comprising:
a plurality of sub-systems each containing
a plurality of pre-cataloged sub-system records,
at least one processor configured to execute instructions thereon, wherein the at least one processor comprises at least one of circuitry, dedicated logic or programmable logic, and
a memory in communication with the at least one processor and configured to store the instructions;
a unified catalog configured to provide a globally unique extent identifier to an extent and to provide a fragment-ID including the globally unique extent identifier and a fragment-number to a fragment assigned to the extent; and
a unified store including a plurality of store servers;
the system further configured to
provide a plurality of sub-systems each comprising a plurality of un-cataloged sub-system specific records,
catalog an un-cataloged sub-system specific record from one of the plurality of sub-systems by generating the fragment from at least a portion of the sub-system specific record, wherein generating the fragment further comprises
generating a fragment-ID for the generated fragment, the fragment-ID comprising the global unique extent identifier of the corresponding extent to which the generated fragment is assigned and a fragment number,
appending the fragment-ID to a payload from the portion of the sub-system specific record, and
generating check data covering the fragment-ID and the payload and appending the check data to an end of the appended fragment-ID and payload,
writing the generated fragment to the corresponding extent at the plurality of store servers of the unified store, wherein each of the plurality of store servers contain the corresponding extent with the assigned fragment,
check, at each of the plurality of store servers that contain the corresponding extent with the assigned fragment, whether the check data associated with the assigned fragment is correctly written, and
send a confirmation from each of the plurality of store servers that contain the corresponding extent with the assigned fragment that the check data associated with the assigned fragment is correctly written.

13. The unified system of record of claim 12, wherein the generated fragment represents an atomic unit of one of a read or a write to the plurality of store servers at the unified store.

14. The unified system of record of claim 12, wherein the payload is a non-fixed length and is immutably fixed after the generated fragment is assigned to the extent.

15. The unified system of record of claim 12, further comprising:
determining, based on the confirmations sent from each of the plurality of store servers that contain the extent with the assigned fragment that the check data associated with the assigned fragment is correctly written, that a replica of the fragment is a non-rejected fragment, thereby ensuring the write command corresponds to the non-rejected fragment.

16. The unified system of record of claim 12, wherein the appending the check data that is appended to the appended fragment-ID and payload is based on receiving the confirmations sent from each of the plurality of store servers that contain the extent with the assigned fragment that the check data associated with the assigned fragment is correctly written.

17. The unified system of record of claim 12, wherein the appending the check data that is appended to the appended fragment-ID and payload is based on receiving confirmations sent from at least one less than the total number of the plurality of store servers that contain the extent with the assigned fragment that the check data associated with the assigned fragment is correctly written.

18. The unified system of record of claim 12, further comprising:
   checking, at each of the plurality of store servers that contain the extent with the assigned fragment, whether the check data associated with the fragment is incorrectly one of written and read; and
   rejecting any fragment on one of the plurality of store servers that contain the extent with the assigned fragment when the check data associated with the fragment determines the fragment was incorrectly one of written and read.

19. The unified system of record of claim 18, wherein rejecting any fragment causes at least one of corrupt data to be rejected, bad data to not be returned, or prevention of a loss of data during replication to the plurality of storage servers of the unified store.

20. The unified system of record of claim 12, further comprising:
   issuing a read command to the plurality of store servers at the unified store, wherein each of the plurality of store servers contain the extent with the assigned fragment; and
   checking, at each of the plurality of store servers that contain the extent with the assigned fragment, whether the check data associated with the fragment is correctly read.

21. The unified system of record of claim 20, further comprising:
   checking, at each of the plurality of store servers that contain the extent with the assigned fragment, whether the check data associated with the fragment is incorrectly read; and
   rejecting any fragment on one of the plurality of store servers that contain the extent with the assigned fragment when the check data associated with the fragment determines the fragment was incorrectly read.

22. The unified system of record of claim 12, wherein the check data comprises cyclic redundancy check (CRC) data.

* * * * *